Nov. 3, 1925.
R. L. SHUEY ET AL
BRAKE
Filed Oct. 10, 1923
1,559,796
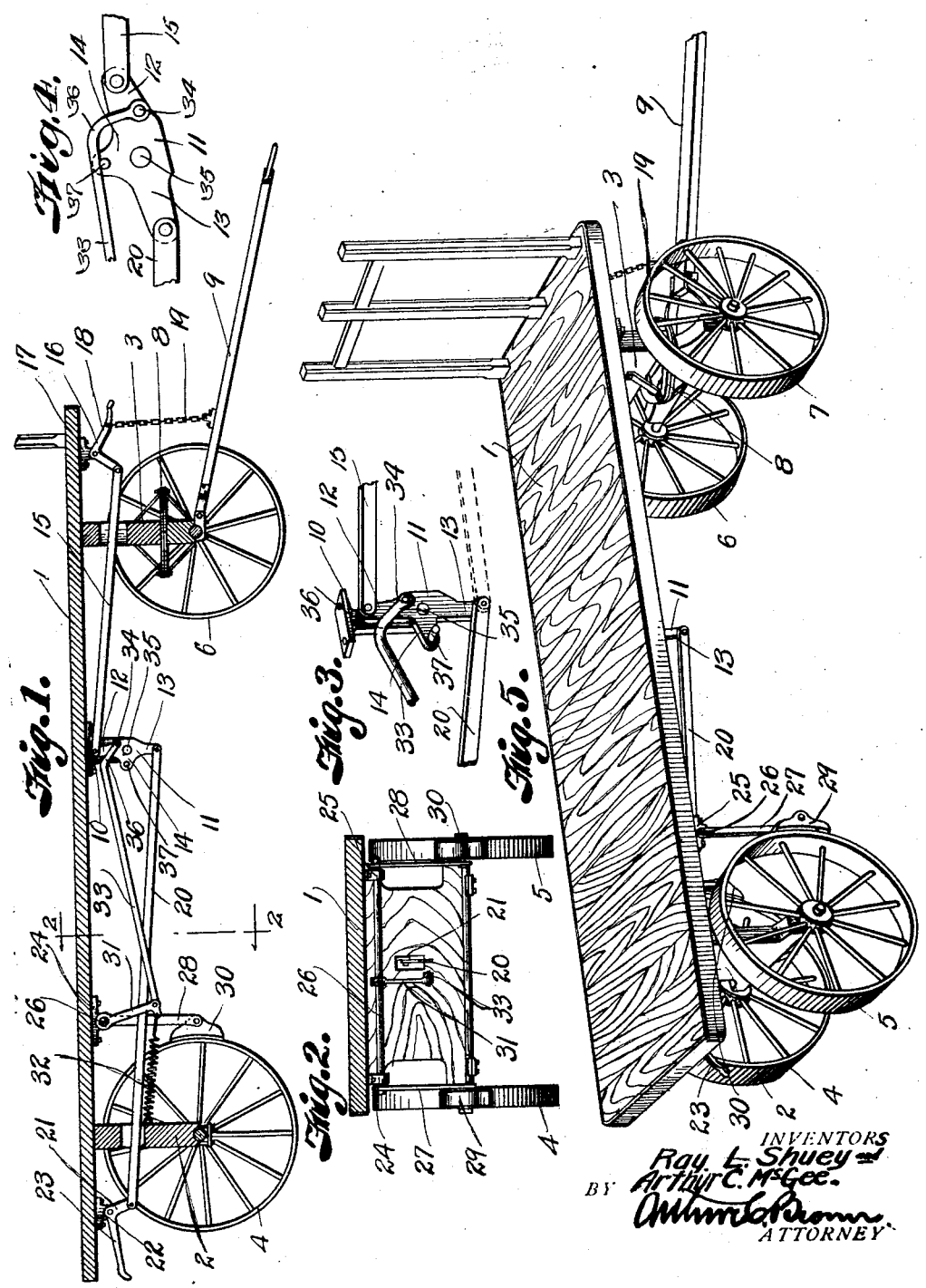
INVENTORS
Ray L. Shuey and
Arthur C. McGee.
BY
ATTORNEY Patented Nov. 3, 1925.

1,559,796

UNITED STATES PATENT OFFICE.

RAY L. SHUEY, OF KANSAS CITY, MISSOURI, AND ARTHUR C. McGEE, OF OLATHE, KANSAS.

BRAKE.

Application filed October 10, 1923. Serial No. 667,633.

*To all whom it may concern:*

Be it known that we, RAY L. SHUEY and ARTHUR C. McGEE, citizens of the United States, residing at Kansas City, Jackson County, Missouri, and Olathe, in the county of Johnson and State of Kansas, have invented certain new and useful Improvements in Brakes; and we do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to vehicle brakes and the primary object thereof is to provide a simple form of brake especially adapted for use in connection with hand trucks. Means is provided whereby the brake may be automatically applied to wheels of the vehicle when the vehicle comes to a state of rest or when the tongue of the vehicle is lowered and the construction is such that the brake may be applied or released from either end of the vehicle, thus effecting a saving of time in handling the truck.

The novel construction of the invention will be apparent by reference to the following description in connection with the accompanying drawings in which:—

Fig. 1 is a vertical, longitudinal, sectional view through a truck to which my invention is applied.

Fig. 2 is a cross sectional view through the truck on the line 2—2 of Fig. 1.

Fig. 3 is an enlarged perspective view of the applicator showing its position to apply the brake.

Fig. 4 is an elevational view of the applicator showing its position to release the brake, and Fig. 5 is a perspective view of the truck with the brake applied.

The truck may be of conventional form and may consist of a platform or body 1 with bolsters 2 and 3 carrying the rear wheels 4 and 5 and the front wheels 6 and 7, the wheels 6 and 7 being secured to the bolster 3 by a fifth wheel construction 8 and the truck may be propelled by a tongue 9.

All of the mechanism heretofore described conforms to known types of trucks so our invention does not reside in the truck per se but rather in the construction of the brake mechanism which may be associated therewith.

Depending from the platform 1 is a bracket 10 on which is pivotally secured a double throw lever 11 having two oppositely disposed arms 12 and 13 and a right angularly projecting arm 14. There is a connecting rod or link 15 pivoted to the upper end of the arm 12 and pivotally secured to an elbow lever 16 fastened to the bracket 17 at the front of the vehicle. The elbow lever 16 has a forwardly extending arm 18 connected to the tongue 9 by a flexible connection, for example a chain 19. The lower arm 13 carries a rearwardly extending rod or link 20 fastened to one arm of the elbow lever 21 supported by the bracket 22 at the rear of the vehicle. The elbow lever 21 has a lateral arm 23 as indicated in Fig. 1. Secured to the brackets 24 and 25 on the platform of the truck is a rock shaft 26 having depending brake levers 27 and 28 carrying the brake shoes 29 and 30. The rock shaft carries a crank 31 to which is secured a tension spring 32 fastened to the bolster 2 so that there will be an inherent tendency of the spring to apply the brakes. The arm 31 has secured to it a connecting rod 33 fastened to the double throw lever 11 at 34 above the pivot 35 which secures the throw lever 11 to the bracket 10. The forward end of the connecting rod 33 has a bent or off set portion 36 so that when the lever 11 is swung in one direction, the pivot 34 will be in line with the pivot 35 so that the brakes will be held released but when the lever 11 is swung enough to allow the pivot 34 to move above the horizontal plane passing through the pivot 35, the spring can exert its tension to apply the brakes. In Fig. 3 I have shown the lever 11 in position to permit the brakes to be applied and in Fig. 4 I have shown the lever 11 in position to hold the brakes released.

When the parts are assembled as shown in Fig. 1, with the brakes applied the operator may push up on the arm 23 or raise the tongue 9 and push up on the arm 18 so as to throw the lever 11 about its pivot 35 in a cross wise direction exerting a pull on the connecting rod 33 toward the front of the vehicle and against the action of the spring 32 throwing the pivot 34 to the position shown in Fig. 4 with the connecting rod resting on the top 37 provided to limit the swing movement of the lever 11, then the brakes will be released and the vehicle may be propelled. When it is desired to apply the brakes the operator can drop the tongue 9 so that the chain or flexible connection 19 will exert a downward pull on the arm 18 or he may exert a downward pressure on the arm 23 so as to throw the lever 11 in a counter-clockwise direction, raising the pivot 34 slightly above a horizontal plane passing through the pivot 35 then the spring 32 may exert its tension to snap the brakes into braking position and of course the brakes can again be released by causing depression of the arm 18 or 23.

It will be observed that the braking action and braking release movements of the braking mechanism may be accomplished in a convenient and expeditious manner and that the brakes can be conveniently applied or released from either end of the vehicle.

What we claim and desire to secure by Letters-Patent is:

1. In combination with a wheeled truck, a bracket, a pivoted lever on the bracket, a rock shaft, brake levers on the rock shaft having brake shoes for engagement with the wheels of the truck, an arm on the rock shaft, a spring connected to a rigid part on the truck and to the arm normally urging the brakes into braking position and a connecting rod between the arm and the first named lever, the connecting rod having an off set portion pivoted to the first named lever, the pivot being adapted to be swung below a horizontal plane passing through the pivotal connection between the first named lever and the bracket when in one position to oppose the spring and adapted to be swung above a horizontal plane passing through the pivotal connection between the first named lever and the bracket to permit the spring to function.

2. In combination with a wheeled truck a bracket, a pivoted lever on the bracket, a rock shaft, brake levers on the rock shaft having brake shoes for engagement with the wheels of the truck, an arm on the rock shaft, a spring connected to a rigid part on the truck and to the arm normally urging the brakes into braking position and a connecting rod between the arm and the first named lever, the connecting rod having an off set portion pivoted to the first named lever, the pivot being adapted to be swung below a horizontal plane passing through the pivotal connection between the first named lever and the bracket when in one position to oppose the spring and adapted to be swung above a horizontal plane passing through the pivotal connection between the first named lever and the bracket to permit the spring to function, an arm on the first named lever, an elbow lever at one end of the truck and a connecting rod between the elbow lever and the last named arm whereby the first named lever may be operated by swinging the elbow lever.

3. In combination with a wheeled truck, a bracket, a pivoted lever on the bracket, a rock shaft, brake levers on the rock shaft having brake shoes for engagement with the wheels of the truck, an arm on the rock shaft, a spring connected to a rigid part on the truck and to the arm normally urging the brakes into braking position and a connecting rod between the arm and the first named lever, the connecting rod having an off set portion pivoted to the first named lever, the pivot being adapted to be swung below a horizontal plane passing through the pivotal connection between the first named lever and the bracket when in one position to oppose the spring and adapted to be swung above a horizontal plane passing through the pivotal connection between the first named lever and the bracket to permit the spring to function, an arm on the first named lever, an elbow lever at one end of the truck and a connecting rod between the elbow lever and the last named arm whereby the first named lever may be operated by swinging the elbow lever, a tongue on the truck and a flexible connection between the elbow lever and the tongue.

4. A braking mechanism for trucks comprising a bracket, a double throw lever pivoted to the bracket, connecting rods pivotally secured to the opposite ends of the double throw lever, elbow levers connected to the ends of the connecting rods, a rock shaft, brake levers on the rock shaft having brake shoes, a depending arm, a spring connected to the depending arm for urging the arm in one direction and a connecting rod connecting the arm to the first named lever, said arm having an off set portion so that its pivotal point can be swung below the pivotal connection between the first named lever and its bracket and a stop on the first named lever for limiting the swinging movement of the last named connecting rod.

5. In combination with a wheeled truck, a bracket, a pivoted lever on the bracket, a rock shaft, brake levers on the rock shaft having brake shoes for engagement with the wheels of the truck, an arm on the rock shaft, a spring connected to a rigid part of the truck and to the arm normally urging the brakes into braking position and a connecting rod between the arm and the first named lever, the connecting rod having an offset portion pivoted to the first named lever, the pivot being adapted to be swung to one side of a plane passing through the pivotal connections between the first named lever and the bracket when in one position to oppose the spring and adapted to be swung to the opposite side of a plane passing through the pivotal connections between the first named lever and the bracket to permit the spring to function.

In testimony whereof we affix our signatures.

RAY L. SHUEY.
ARTHUR C. McGEE.